United States Patent
Ingle et al.

(10) Patent No.: US 9,037,792 B1
(45) Date of Patent: May 19, 2015

(54) SYSTEMS AND METHODS FOR PROVIDING CACHING FOR APPLICATIONS WITH SOLID-STATE STORAGE DEVICES

(71) Applicant: Symantec Corporation, Mountain View, CA (US)

(72) Inventors: Swapnil Ingle, Amravati (IN); Shirish Vijayvargiya, Wakad (IN); Sanjay Kumar, Wakad (IN); Rishikesh Jethwani, Maharashtra (IN); Niranjan Pendharkar, NCL/Pashan (IN); Anindya Banerjee, Wakad (IN)

(73) Assignee: Symantec Corporation, Mountain View, CA (US)

( * ) Notice: Subject to any disclaimer, the term of this patent is extended or adjusted under 35 U.S.C. 154(b) by 177 days.

(21) Appl. No.: 13/911,540

(22) Filed: Jun. 6, 2013

(51) Int. Cl.
*G06F 12/08* (2006.01)
*G06F 12/02* (2006.01)

(52) U.S. Cl.
CPC ........ *G06F 12/0866* (2013.01); *G06F 12/0246* (2013.01); *G06F 2212/2022* (2013.01)

(58) Field of Classification Search
CPC ............ G06F 12/0866; G06F 12/0246; G06F 2212/2022
USPC .................................................. 711/103, 113
See application file for complete search history.

(56) References Cited

U.S. PATENT DOCUMENTS

| | | | |
|---|---|---|---|
| 7,899,987 B2 * | 3/2011 | Salomon et al. | 711/112 |
| 2007/0083703 A1 * | 4/2007 | Kolli et al. | 711/112 |
| 2009/0240881 A1 * | 9/2009 | Halloush et al. | 711/114 |
| 2011/0246821 A1 * | 10/2011 | Eleftheriou et al. | 714/15 |
| 2012/0023305 A1 * | 1/2012 | Satoyama et al. | 711/170 |

OTHER PUBLICATIONS

Anindya Banerjee et al.; Systems and Methods for Caching Data Blocks Associated with Frequently Accessed Files; U.S. Appl. No. 13/081,706; Apr. 7, 2011.

* cited by examiner

*Primary Examiner* — Than Nguyen
(74) *Attorney, Agent, or Firm* — ALG Intellectual Property, LLC

(57) ABSTRACT

A computer-implemented method for providing caching for applications with solid-state storage devices may include (1) identifying a plurality of solid-state drives that are available for caching input/output operations, (2) detecting at least one distinguishing hardware property of at least one solid-state drive within the plurality of solid-state drives, (3) determining at least one attribute of an application, and (4) selecting the solid-state drive for caching at least one input/output operation of the application based at least in part on the attribute of the application in combination with the distinguishing hardware property of the solid-state drive. Various other methods, systems, and computer-readable media are also disclosed.

20 Claims, 6 Drawing Sheets

SYSTEMS AND METHODS FOR PROVIDING CACHING FOR APPLICATIONS WITH SOLID-STATE STORAGE DEVICES

BACKGROUND

Computing devices often cache data in a caching mechanism to facilitate fast, efficient access to the data. For example, a computing device may attempt to access data stored within a mass storage device (such as a hard disk drive) that is unable to facilitate access to the data as quickly or efficiently as a caching mechanism. In this example, the computing device may copy the data from the mass storage device to a caching mechanism (such as a solid-state drive caching system) in order to increase the speed at which the data may be accessed.

Different types of solid-state drives may present different benefits and drawbacks for caching data. Some solid-state drives may provide very high data transfer rates but may be commensurately expensive. Some solid-state drives may provide efficient read performance but may degrade relatively quickly from frequent write operations. Unfortunately, configuring a caching system with a solid-state drive may present difficult choices to the consumer, who may be faced with difficult tradeoffs between cost, performance, endurance, and other factors.

Accordingly, the instant disclosure identifies and addresses a need for additional and improved systems and methods for providing caching for applications with solid-state storage devices.

SUMMARY

As will be described in greater detail below, the instant disclosure generally relates to systems and methods for providing caching for applications with solid-state storage devices by matching applications to solid-state drives for caching based on the attributes of the applications and the distinctive properties of the solid-state drives to help ensure that a solid-state drive that is better suited for an application is selected as a caching device for the application. In some examples, these systems and methods may dynamically select solid-state drives for applications, switching solid-state drives for an application based on changing attributes of the application (e.g., changing input/output patterns of the application).

In one example, a computer-implemented method for providing caching for applications with solid-state storage devices may include (1) identifying a plurality of solid-state drives that are available for caching input/output operations, (2) detecting at least one distinguishing hardware property of at least one solid-state drive within the plurality of solid-state drives, (3) determining at least one attribute of an application, and (4) selecting the solid-state drive for caching at least one input/output operation of the application based at least in part on the attribute of the application in combination with the distinguishing hardware property of the solid-state drive.

In some examples, determining the attribute of the application may include determining an input/output pattern of input/output operations performed by the application. In some examples, determining the attribute of the application may include determining a priority level for input/output operations performed by the application and/or a service-level agreement covering the application.

In some examples, detecting the distinguishing hardware property of the solid-state drive may include detecting a data transfer rate of the solid-state drive that differs from a different data transfer rate of an alternative solid-state drive within the plurality of solid-state drives. In some examples, detecting the distinguishing hardware property of the solid-state drive may include detecting a write endurance of the solid-state drive that differs from an alternative write endurance of an alternative solid-state drive within the plurality of solid-state drives.

In one embodiment, (1) detecting the distinguishing hardware property of the solid-state drive may include detecting that the solid-state drive may include a single-level-cell solid-state drive, (2) determining the attribute of the application may include determining that the application is write-intensive according to a predefined write-intensity metric, and (3) selecting the solid-state drive for caching the input/output operation of the application may be based at least in part on the solid-state drive comprising a single-level-cell solid-state drive in combination with determining that the application is write-intensive according to the predefined write-intensity metric.

In one embodiment, (1) detecting the distinguishing hardware property of the solid-state drive may include detecting that the solid-state drive may include a multi-level-cell solid-state drive, (2) determining the attribute of the application may include determining that the application is read-intensive according to a predefined read-intensity metric, and (3) selecting the solid-state drive for caching the input/output operation of the application may be based at least in part on the solid-state drive comprising a multi-level-cell solid-state drive in combination with determining that the application is read-intensive according to the predefined read-intensity metric.

In some examples, the computer-implemented method may further include selecting an alternative solid-state drive within the plurality of solid-state drives for caching at least one input/output operation of an additional application based at least in part on an attribute of the alternative application in combination with a distinguishing hardware property of the alternative solid-state drive.

In one embodiment, the computer-implemented method may further include (1) determining that the attribute of the application may have changed and (2) selecting an alternative solid-state drive within the plurality of solid-state drives for caching at least one additional input/output operation of the application based at least in part on determining that the attribute of the application may have changed in combination with a distinguishing hardware property of the alternative solid-state drive.

In some examples, the computer-implemented method may further include caching the input/output operation of the application on the solid-state drive.

In one embodiment, a system for implementing the above-described method may include (1) an identification module that identifies a plurality of solid-state drives that are available for caching input/output operations, (2) a detection module that detects at least one distinguishing hardware property of at least one solid-state drive within the plurality of solid-state drives, (3) a determination module that may determine at least one attribute of an application, (4) a selection module that selects the solid-state drive for caching at least one input/output operation of the application based at least in part on the attribute of the application in combination with the distinguishing hardware property of the solid-state drive, and (5) at least one processor configured to execute the identification module, the detection module, the determination module and the selection module.

In some examples, the above-described method may be encoded as computer-readable instructions on a computerreadable-storage medium. For example, a computer-readable-storage medium may include one or more computer-executable instructions that, when executed by at least one processor of a computing device, may cause the computing device to (1) identify a plurality of solid-state drives that are available for caching input/output operations, (2) detect at least one distinguishing hardware property of at least one solid-state drive within the plurality of solid-state drives, (3) determine at least one attribute of an application, and (4) select the solid-state drive for caching at least one input/output operation of the application based at least in part on the attribute of the application in combination with the distinguishing hardware property of the solid-state drive.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
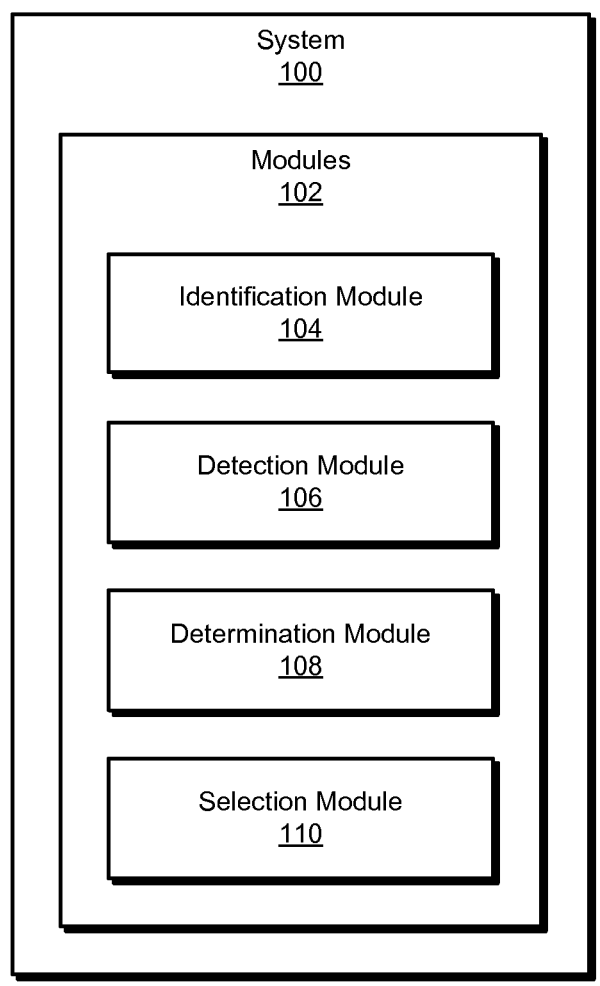
FIG. 1 is a block diagram of an exemplary system for providing caching for applications with solid-state storage devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for providing caching for applications with solid-state storage devices. As will be explained in greater detail below, by matching applications to solid-state drives for caching based on the attributes of the applications and the distinctive properties of the solid-state drives, the systems and methods described herein may make improve the performance, endurance, and/or cost-effectiveness of mixed-type solid-state drives in caching systems. In some examples, by dynamically selecting solid-state drives for applications (e.g., switching solid-state drives for an application based on changing attributes of the application), these systems and methods may further improve the performance, endurance, and/or cost-effectiveness of mixed-type solid-state drives in caching systems.

Figure 2:
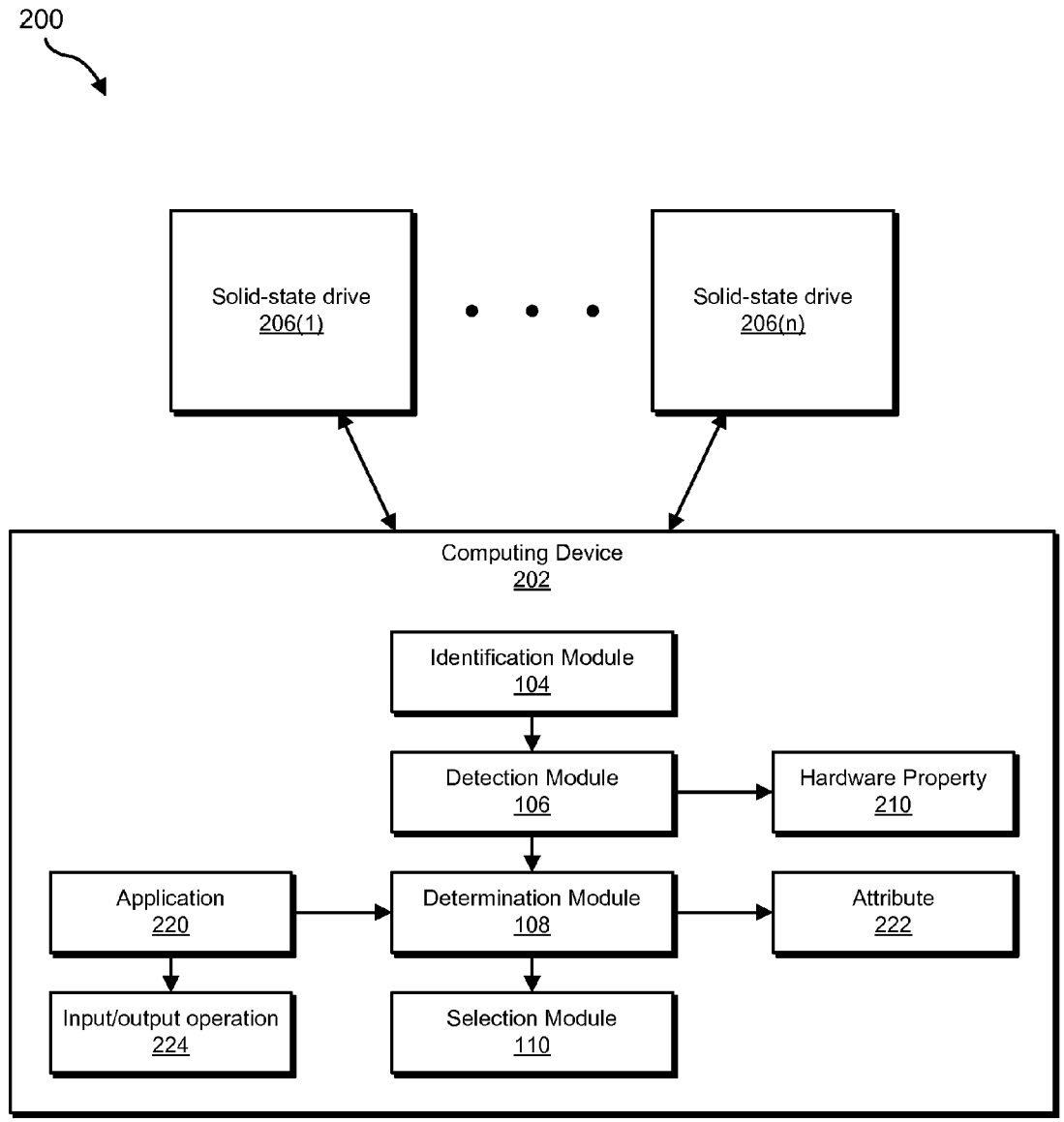
FIG. 2 is a block diagram of an exemplary system for providing caching for applications with solid-state storage devices.
Figure 3:
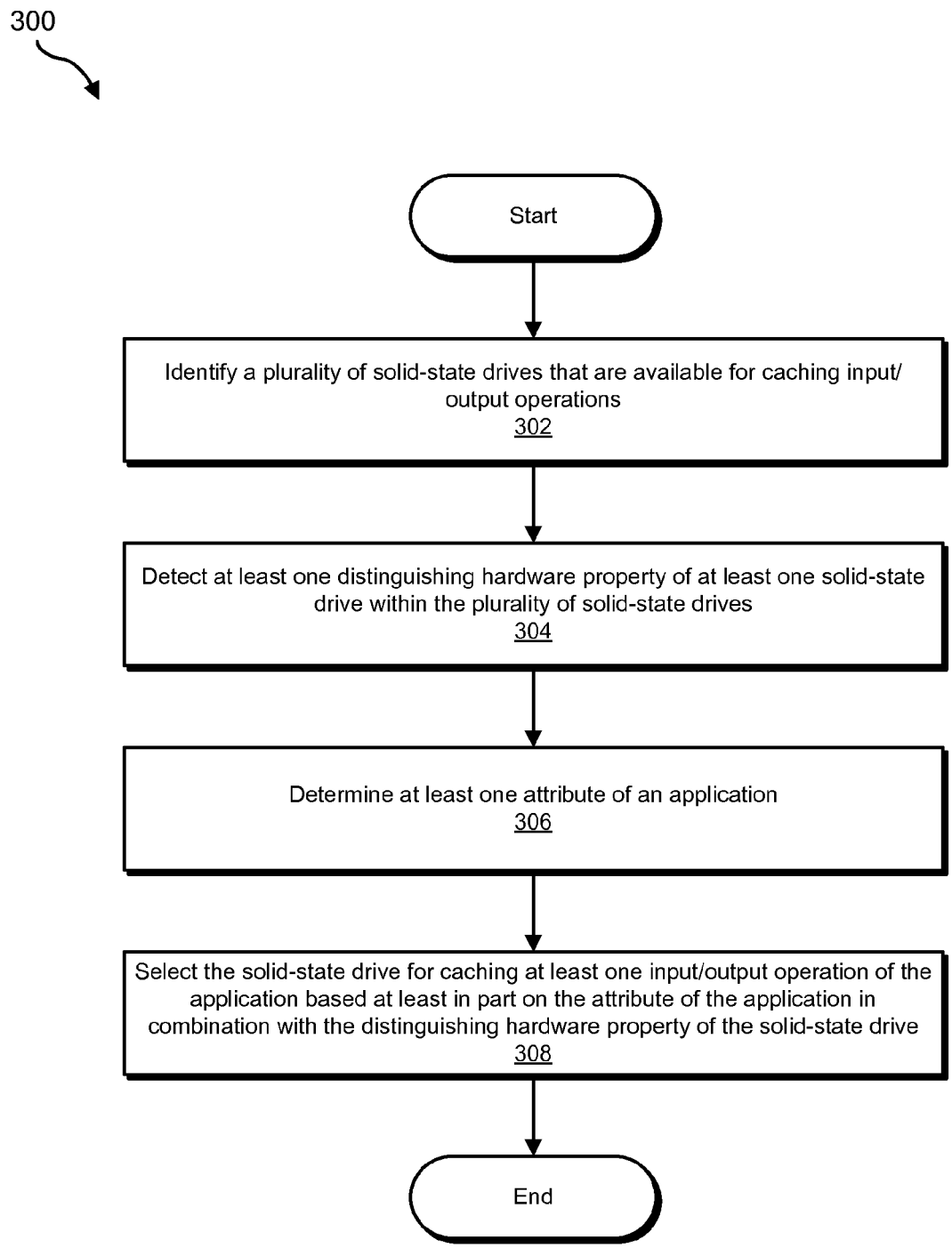
FIG. 3 is a flow diagram of an exemplary method for providing caching for applications with solid-state storage devices.
Figure 4:
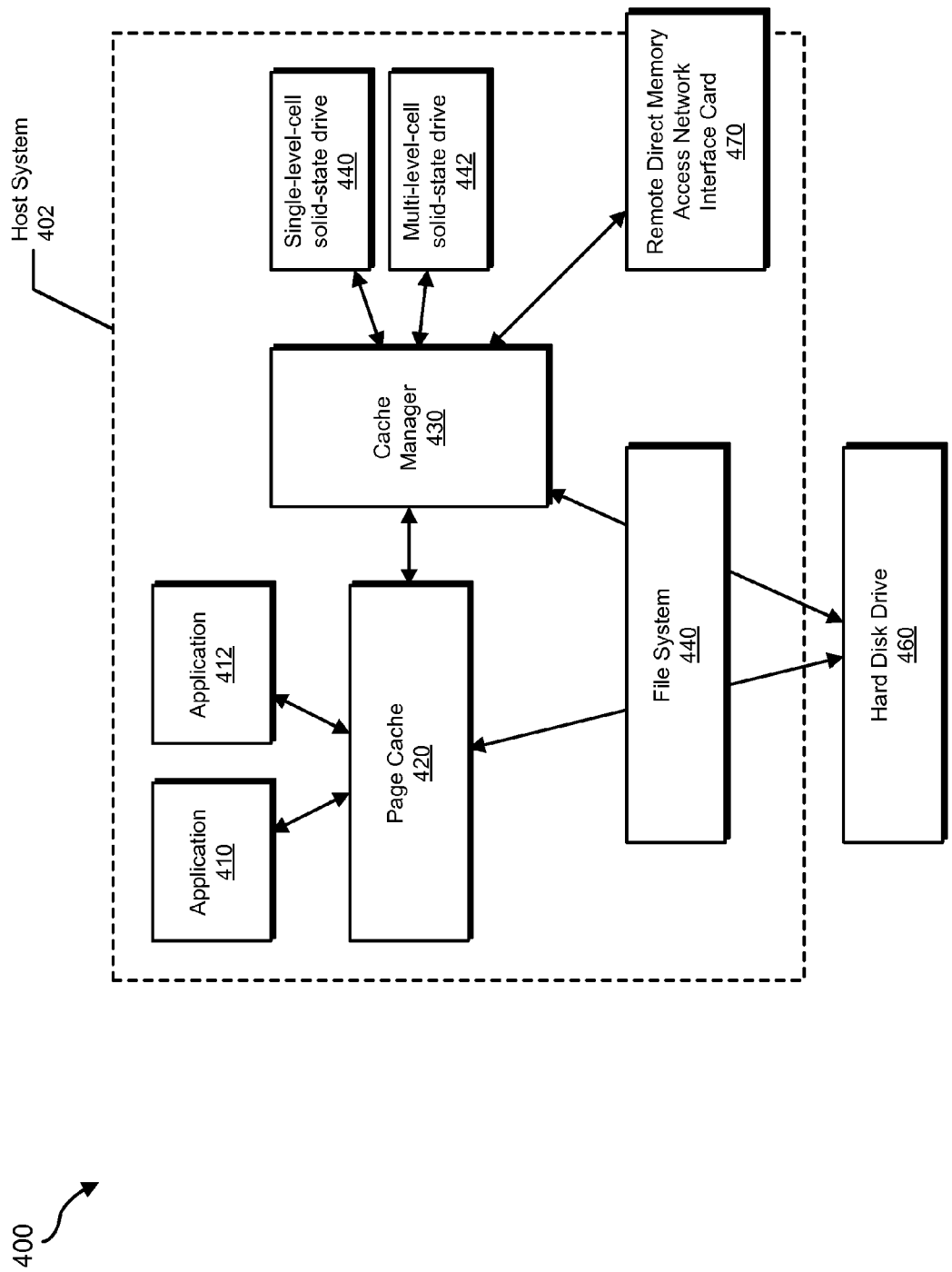
FIG. 4 is a block diagram of an exemplary system for providing caching for applications with solid-state storage devices.

The following will provide, with reference to FIGS. 1, 2, and 4, detailed descriptions of exemplary systems for providing caching for applications with solid-state storage devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for providing caching for applications with solid-state storage devices. As illustrated in this figure, exemplary system 100 may include one or more modules 102 for performing one or more tasks. For example, and as will be explained in greater detail below, exemplary system 100 may include an identification module 104 that may identify a plurality of solid-state drives that are available for caching input/output operations. Exemplary system 100 may additionally include a detection module 106 that may detect at least one distinguishing hardware property of at least one solid-state drive within the plurality of solid-state drives. Exemplary system 100 may also include a determination module 108 that may determine at least one attribute of an application. Exemplary system 100 may additionally include a selection module 110 that may select the solid-state drive for caching at least one input/output operation of the application based at least in part on the attribute of the application in combination with the distinguishing hardware property of the solid-state drive. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or solid-state drives 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 with solid-state drives 206(1)-(n) available for caching input/output for one or more applications, including an application 220. Computing device 202 may be programmed with one or more of modules 102. Additionally or alternatively, solid-state drives 206(1)-(n) may be programmed with one or more of modules 102.

In one embodiment, one or more of modules 102 from FIG. 1 may, when executed by at least one processor of computing device 202 and/or solid-state drives 206(1)-(n), facilitate caching in computing device 202 and solid-state drives 206(1)-(n). In some embodiments, one or more of modules 102 may cause computing device 202 and/or solid-state drives 206(1)-(n) to provide caching for applications with solid-state storage devices. For example, and as will be described in greater detail below, identification module 104 may be programmed to identify solid-state drives 206(1)-(n) that are available for caching input/output operations. Detection module 106 may be programmed to detect at least one distinguishing hardware property 210 of solid-state drive 206(1). Determination module 108 may be programmed to determine at least one attribute 222 of application 220. Selection module 110 may be programmed to select solid-state drive 206(1) for caching at least one input/output operation 224 of application 220 based at least in part on attribute 222 of application 220 in combination with distinguishing hardware property 210 of solid-state drive 206(1).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Solid-state drives 206(1)-(n) generally represent any type or form of solid-state storage device. Examples of solid-state drives 206(1)-(n) may include, without limitation, single-level-cell solid-state drives, multi-level-cell solid-state drives, enterprise multi-level-cell solid-state drives, and triple-level-cell solid-state drives.

FIG. 3 is a flow diagram of an exemplary computer-implemented method 300 for providing caching for applications with solid-state storage devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a plurality of solid-state drives that are available for caching input/output operations. For example, at step 302 identification module 104 may, as part of computing device 202 in FIG. 2, identify solid-state drives 206(1)-(n) that are available for caching input/output operations.

As used herein, the phrase "solid-state drive" may refer to any storage device using solid-state memory to store data. In some examples, the phrase "solid-state drive" may refer to a storage device that stores data persistently. For example, a solid-state drive may include flash memory (e.g., NAND-based flash memory) and/or dynamic random access memory ("DRAM"). In some examples, a solid-state drive may include no moving mechanical components.

As used herein, the term as used herein, the term "caching" may refer to any process that facilitates data access by storing and/or making available data that may be likely to be accessed (e.g., because the data has recently been read from and/or written to).

As used herein, the phrase "input/output operation" may refer to any operation to read from and/or write to a storage system and/or the data that is the subject of any such operation. In some examples, the input/output operation may be directed to a backing store, and one or more of the examples herein may cache the input/output operation at a cache (e.g., that includes one or more of the plurality of solid-state drives).

Identification module 104 may identify the plurality of solid-state drives in any suitable manner. For example, identification module 104 may operate as a part of a cache manager and identify the plurality of solid-state devices as devices available for use in caching operations. For example, the cache manager may operate as a part of a file system, a filter driver, and/or a volume manager.

In some examples, identification module 104 may identify the plurality of solid-state drives as including mixed types of solid-state drives. For example, identification module 104 may determine that the plurality of solid-state drives includes one or more single-level-cell solid-state drives and one or more multi-level-cell solid-state drives. Additionally or alternatively, identification module 104 may determine that the plurality of solid-state drives includes at least one solid-state drive with a property (e.g., data transfer rate, endurance, etc.) that differs from a property of at least one other solid-state drive within the plurality of solid-state drives. In some examples, one or more of the systems described herein may perform one or more of the steps described herein (e.g., selectively assign applications to particular solid-state drives) based on identification module 104 having identified mixed types of solid-state drives within the plurality of solid-state drives.

FIG. 4 illustrates an exemplary system 400 for providing caching for applications with solid-state storage devices. As shown in FIG. 4, exemplary system 400 may include a host system 402 executing applications 410 and 412. In one example, applications 410 and 412 may store data on a hard disk drive 460 via a file system 440. A page cache 420 may cache some data for applications 410 and 412 using volatile memory. A cache manager 430 may also provide an additional layer of caching for applications 410 and 412 (e.g., through page cache 420) by storing cached data on a single-level-cell solid-state drive 440 and/or a multi-level-cell solid-state drive 442. Using FIG. 4 as an example, at step 302 identification module 104 may (e.g., as a part of cache manager 430) identify single-level-cell solid-state drive 440 and multi-level-cell solid-state drive 442 as available for caching input/output operations.

Returning to FIG. 3, at step 304 one or more of the systems described herein may detect at least one distinguishing hardware property of at least one solid-state drive within the plurality of solid-state drives. For example, at step 304 detection module 106 may, as part of computing device 202 in FIG. 2, detect at least one distinguishing hardware property 210 of solid-state drive 206(1).

As used herein, the phrase "hardware property" may refer to any property pertaining to a solid-state drive as hardware. For example, the phrase "hardware property" may refer to a type, design, make, and/or model of a solid-state drive. Additionally or alternatively, the phrase "hardware property" may refer to a metric of a solid-state drive, such as a performance metric, an endurance metric, etc. In some examples, the phrase "hardware property" may refer to a contextual property of a solid-state drive as hardware, such as the initial cost of the solid-state drive, the power consumption of the solid-state drive, and/or the cost of use of the solid-state drive. In some examples, the hardware property may include a composite property based on the relationship of one or more properties of the solid-state drive. For example, the hardware property may use a performance per endurance metric, a cost per performance metric, and/or a cost per storage metric.

Detection module 106 may detect the distinguishing hardware property in any suitable manner. For example, detection module 106 may use an application programming interface of the solid-state drive to retrieve the distinguishing hardware property. In some examples, detection module 106 may then tag the solid-state drive with metadata describing the distinguishing hardware property. For example, detection module 106 may retrieve a model of the solid-state drive and/or a data transfer rate of the solid-state drive and tag the solid-state drive with "FAST" or "SLOW" based on the retrieved data. Accordingly, in some examples detection module 106 may detect the distinguishing hardware property by reading a metadata tag describing the solid-state drive (e.g., a metadata tag previously applied by detection module 106 and/or another system).

In some examples, detection module 106 may detect the distinguishing hardware property in comparison with a hardware property of one or more other solid-state drives within the plurality of solid-state drives. For example, detection module 106 may determine that a solid-state drive is "FAST" and tag the solid-state drive as such by determining that the solid-state drive is faster than one or more alternative solid-state drives within the plurality of solid-state drives. Accordingly, in some examples, the distinguishing hardware feature may include a feature that describes the solid-state drive relative to one or more of the other solid-state drives within the plurality of solid-state drives.

Detection module 106 may detect any of a variety of distinguishing hardware properties of the solid-state drive. For example, detection module 106 may detect a data transfer rate of the solid-state drive that differs from a different data transfer rate of an alternative solid-state drive within the plurality of solid-state drives. For example, detection module 106 may detect a read speed and/or a write speed (e.g., in megabytes per second) of the solid-state drive.

In some examples, detection module 106 may detect a write endurance of the solid-state drive that differs from an alternative write endurance of an alternative solid-state drive within the plurality of solid-state drive. For example, detection module 106 may detect a projected maximum program/erase cycle count of the solid-state drive. As another example, detection module 106 may detect an expected write amplification of the solid-state drive. Generally, detection module 106 may detect any property of the solid-state drive that describes how write operations affect the longevity, reliability, and/or performance of the solid-state drive.

In some examples, detection module 106 may detect that the solid-state drive includes a single-level-cell solid-state drive (e.g., a solid-state drive that uses single-level cell technology to store one bit in each cell). Additionally or alternatively, detection module 106 may detect that the solid-state drive includes a multi-level-cell solid-state drive (e.g., a solid-state drive that uses multi-level cell technology to store more than one bit in each cell). In some examples, detection module 106 may detect that the solid-state drive includes an enterprise multi-level-cell solid-state drive (an "eMLC SSD") and/or a triple-level-cell solid-state drive (a "TLC SSD").

Using FIG. 4 as an example, at step 304 detection module 106 may (e.g., as a part of cache manager 430) detect that single-level-cell solid-state drive 440 uses single-level cell technology, that single-level-cell solid-state drive 440 has a high cost per storage unit ratio (e.g., relative to multi-level-cell solid-state drive 442), that single-level cell solid-state drive 440 has a low error rate, and/or that single-level cell solid-state drive 440 has a low write endurance.

Returning to FIG. 3, at step 306 one or more of the systems described herein may determine at least one attribute of an application. For example, at step 306 determination module 108 may, as part of computing device 202 in FIG. 2, determine at least one attribute 222 of application 220.

As used herein, the term "application" may refer to any application, program, process, service, script, and/or daemon that may perform input/output operations.

As used herein, the term "attribute" as applied to applications may refer to any trait and/or property of an application, including static attributes (e.g., unchanging attributes of the application), dynamic attributes (e.g., attributes that may change as the state of the application changes), intrinsic attributes (e.g., attributes that arise from the nature of the application), and/or extrinsic attributes (e.g., attributes that are assigned to the application). Examples of attributes of an application may include an input/output throughput of the application, a type of file stored to and/or read from by the application, a priority level assigned to the application, a service-level requirement of the application, a current activity level of the application, and/or a sensitivity of the application to input/output performance.

In some examples, determination module 108 may determine the attribute of the application by determining an input/output pattern of input/output operations performed by the application. For example, determination module 108 may determine a projected and/or actual amount of reads performed by the application, a projected and/or actual amount of write performed by the application, and/or a projected and/or actual ratio of reads to writes performed by the application. In some examples, determination module 108 may determine a type of file that the application typically handles and/or is handling.

In some examples, determination module 108 may determine a priority level for input/output operations performed by the application. For example, determination module 108 may determine a scheduling decision pertaining to the application and/or a priority rank assigned to the application. In some examples, determination module 108 may determine the priority level of the application relative to at least one other application (e.g., that is also configured to using the plurality of solid-state drives for caching). In one example, determination module 108 may determine a service-level agreement that covers the application. For example, determination module 108 may identify a minimum throughput and/or input/output reliability requirement for the application.

In some examples, determination module 108 may determine that the application is write-intensive according to a predefined write-intensity metric. The write-intensity metric may be based on any of a variety of criteria. For example, the write-intensity of the application may be measured according an observed amount and/or proportion of write operations by the application. In some examples, the write-intensity of the application may be measured according to a projected amount and/or proportion of writes by the application. For example, the write-intensity of the application may be based on one or more file types used by the application. For example, determination module 108 may determine that the application is write-intensive based on the application performing input/output operations primarily on dynamic data, such as file system metadata.

In some examples, determination module 108 may determine that the application is read-intensive according to a predefined read-intensity metric. The read-intensity metric may be based on any of a variety of criteria. For example, the read-intensity of the application may be measured according an observed amount and/or proportion of read operations by the application. In some examples, the read-intensity of the application may be measured according to a projected amount and/or proportion of reads by the application. For example, the read-intensity of the application may be based on one or more file types used by the application. For example, determination module 108 may determine that the application is read-intensive based on the application performing input/output operations primarily on static data, such as video files and/or digital image files.

Determination module 108 may determine the attribute of the application in any of a variety of ways. For example, determination module 108 may observe the behavior of the application. Additionally or alternatively, determination module 108 may uniquely identify the application and query a database for the attribute of the application. In some examples, determination module 108 may determine the attribute of the application by receiving a message from the application and/or a file system used by the application that indicates the attribute. In some examples, determination module 108 may receive a message from the application indicating whether the input/output operations of the application are focused on persistent data or on temporary data. In some examples, determination module 108 may receive a message from the application indicating whether the application is better adapted for write-back caching or write-through caching. As another example, determination module 108 may receive a message from the application requesting caching by single-level-cell solid-state drive instead of a multi-level-cell solid-state drive (or vice versa).

Using FIG. 4 as an example, at step 306 determination module 108 may determine an attribute of application 410. For example, determination module 108 may determine that application 410 is a write-intensive application with a high service-level requirement.

Returning to FIG. 3, at step 308 one or more of the systems described herein may select the solid-state drive for caching at least one input/output operation of the application based at least in part on the attribute of the application in combination with the distinguishing hardware property of the solid-state drive. For example, at step 308 selection module 110 may, as part of computing device 202 in FIG. 2, select the solid-state drive for caching at least one input/output operation 224 of application 220 based at least in part on attribute 222 of application 220 in combination with distinguishing hardware property 210 of solid-state drive 206(1).

Selection module 110 may select the solid-state drive based on the combination of the attribute of the application and the distinguishing hardware property in any of a variety of ways. For example, selection module 110 may select a solid-state drive with a high reliability rating for a write-intensive application, leaving a solid-state drive with a lower reliability rating to cache input/output for a read-intensive application. Because a read attempt can resort to backing storage in case of a failure, in this manner selection module 110 may improve the overall reliability and efficiency of the caching system for the applications that collectively rely on the caching system.

As mentioned earlier, in some examples, one or more of the systems described herein (e.g., detection module 106) may have detected that the solid-state drive includes a single-level-cell solid-state drive. Additionally, in some examples, one or more of the systems described herein (e.g., determination module 108) may have determined that the application is write-intensive. Accordingly, selection module 110 may select the single-level-cell solid-state drive for caching the input/output of the write-intensive application. In this manner, selection module 110 may improve the performance of the application while preventing the application from negatively impacting the endurance of a solid-state drive less suited for frequent write operations (e.g., a multi-level-cell solid-state drive).

Likewise, in some examples, one or more of the systems described herein (e.g., detection module 106) may have detected that the solid-state drive includes a multi-level-cell solid-state drive. Additionally, in some examples, one or more of the systems described herein (e.g., determination module 108) may have determined that the application is read-intensive. Accordingly, selection module 110 may select the multi-level-cell solid-state drive for caching the input/output of the read-intensive application. In this manner, selection module 110 may provide adequate caching performance for the application while taking advantage of a solid-state drive that would be negatively impacted by frequently write operations but that can cache read-intensive applications cost effectively.

In some examples, selection module 110 may also select an alternative solid-state drive within the plurality of solid-state drives for caching at least one input/output operation of an additional application based at least in part on an attribute of the alternative application in combination with a distinguishing hardware property of the alternative solid-state drive.

Using FIG. 4 as an example, at step 308 selection module 110 may (e.g., as a part of cache manager 430) select single-level-cell solid-state drive 440 to cache input/output for write-intensive application 410 and multi-level-cell solid-state drive 442 to cache input/output for read-intensive application 412. Additionally in some examples, application module 410 may be configured for a failover. Because the systems and methods described herein may have assigned single-level-cell solid-state drive 440 to cache all input/output for application 410, a remote direct memory access network interface card 470 may replicate single-level-cell solid-state drive 440 to a remote caching device to facilitate a more efficient and effective failover.

In some examples, one or more of the systems described herein (e.g., determination module 108) may determine that the attribute of the application has changed. For example, an input/output pattern of the application may change over time (e.g., with increasing write activity). As another example, an assigned priority of the application may change. In these examples, selection module 110 may select an alternative solid-state drive within the plurality of solid-state drives for caching at least one additional input/output operation of the application based at least in part on determining that the attribute of the application has changed in combination with a distinguishing hardware property of the alternative solid-state drive. Using FIG. 4 as an example, selection module 110 may determine that application 410, which was write-intensive, has become read-intensive, and that application 412, which was read-intensive, has become write intensive. Accordingly, selection module 110 may reassign single-level-cell solid-state drive 440 to cache input/output for application 412 and may reassign multi-level-cell solid-state drive 440 to cache input/output for application 410. By dynamically selecting solid-state drives for applications based on dynamically changing attributes of the applications, the systems and methods described herein may take greater advantage of the particular properties of differing solid-state drives to optimize the efficacy and cost-efficiency of caching application input/output using solid-state drives.

As explained above in connection with method 300 in FIG. 3, various types of solid-state drives may be available in the market with varying levels of performance and cost. Solid-state drives with better performance (such as single-level-cell solid-state drives), may be costlier, while solid-state drives with inferior performance (e.g., multi-level-cell solid-state drives), may be less expensive. Additionally, some applications may access files more, and some may access files less. Furthermore, some applications, processes, and/or files may have a greater priority level than others.

In some examples, to improve input/output performance in a cost-effective manner, the systems described herein may configure different types of solid-state drives under a single cache manager for caching input/output. Based on the type of input/output and the properties of the solid-state drives, the cache manager may select a suitable solid-state drive for caching the type of input/output. For example, the cache manager may select a multi-level-cell solid-state drive for caching data for write-sensitive applications because the multi-level-cell solid-state drive may be cheaper than a single-level-cell solid-state drive. Alternatively, the cache manager may select a single-level-cell solid-state drive for caching data for write-centric applications because single-level-cell solid-state drives may handle write operations more robustly (e.g., with less cost to the endurance of the drive).

Additionally, the cache manager may select solid-state devices to cache certain types of data based on an administrator policy. For example, the policy may instruct the cache manager to cache data of particular application and/or a particular pattern to a particular cache device. This may make replication simpler when replicating data for a specific application. Additionally or alternatively, the policy may move cached data faster solid-state drive to a slower solid-state drive (or vice versa) based on I/O access patterns to utilize solid-state drives cost-effectively.

In some examples, the cache manager may include a separate file system or a filter driver between a virtual file system and the file system used by an application. The cache manager may proactively move pages across fast and slow tiers of solid-state-drive based cache based on the changing priority of the application. Alternatively, the cache manager may operate from a volume manager layer (e.g., if solid-state drive caching is disabled at the file system layer). In this case, the file system may pass information about caching types (e.g., persistent, temporary, write back, write through, bypass the solid-state drives, multi-level-cell solid-state drive vs. single-level-cell solid-state drives, etc.) to the volume manager Additionally, for caching decisions from the volume manager level, an application may directly pass information about where to cache its input/output.

Figure 5:
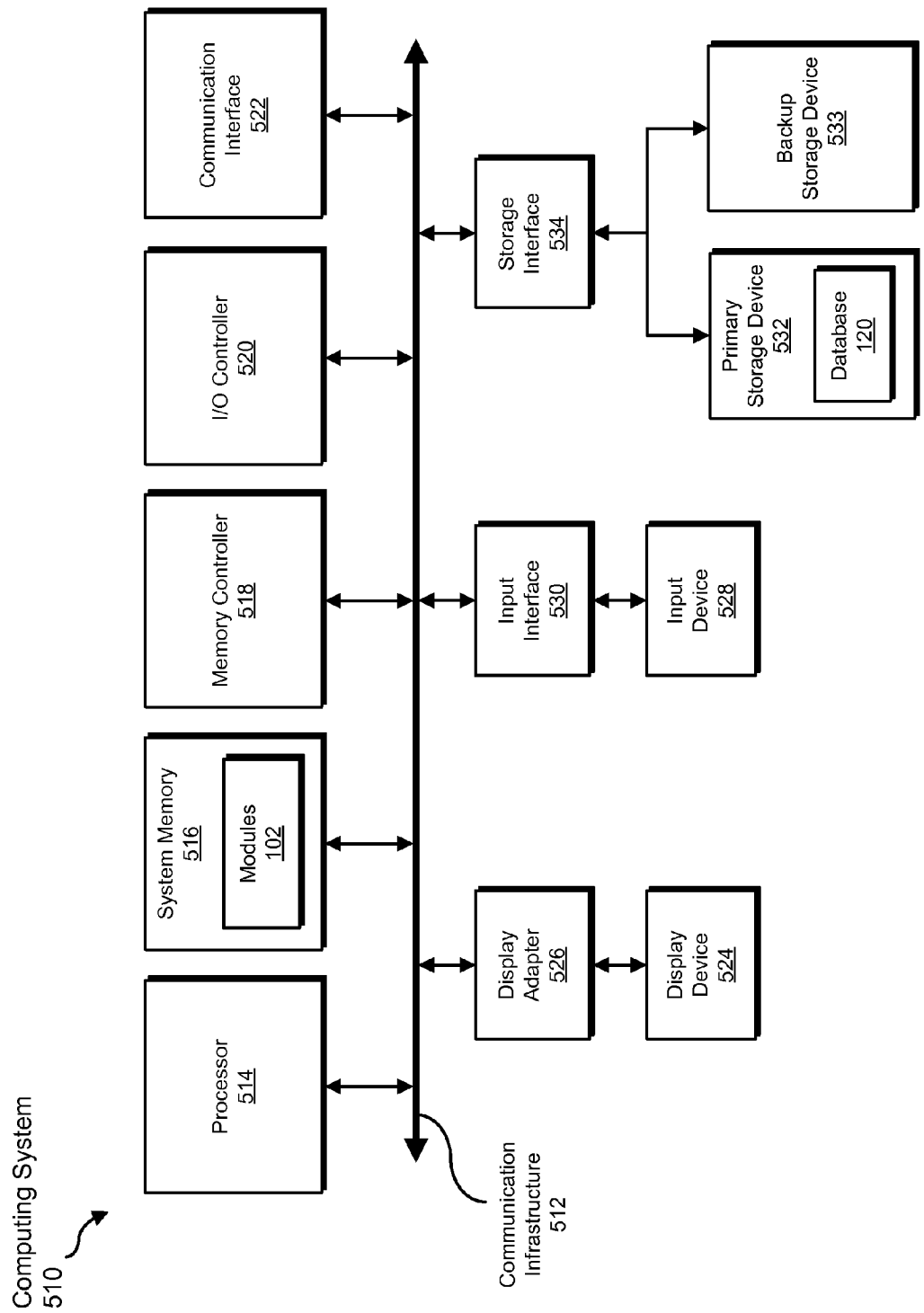
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
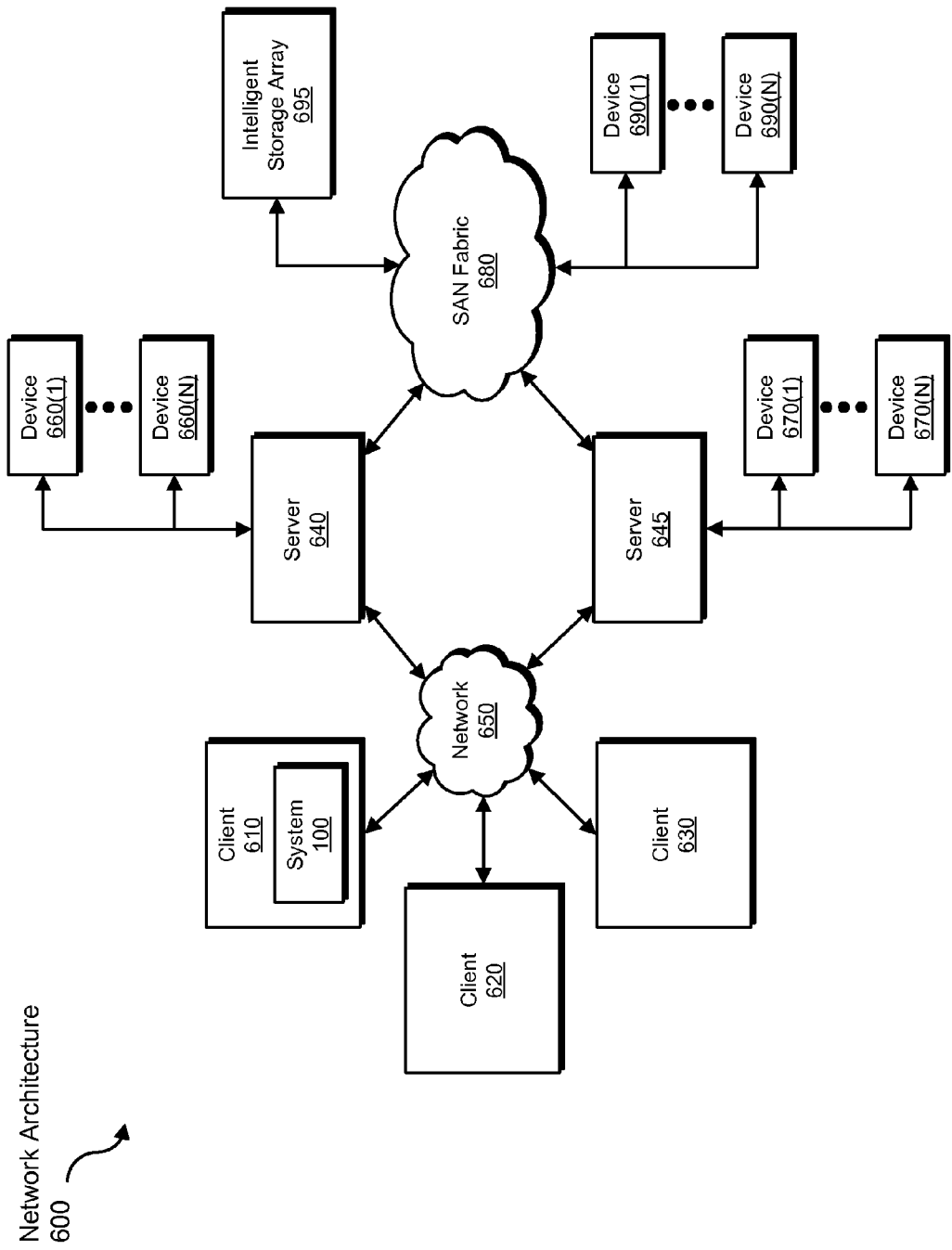
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for providing caching for applications with solid-state storage devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive solid-state drive properties to be transformed, transform the properties with attributes of an application, output a result of the transformation to a cache manager, use the result of the transformation to select a solid-state drive for caching I/O for the application, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing caching for applications with solid-state storage devices, at least a portion of the method being performed by a computing device comprising at least one processor, the method comprising:
   identifying a plurality of solid-state drives that are available for caching input/output operations;
   detecting at least one distinguishing hardware property of at least one solid-state drive within the plurality of solid-state drives;
   determining at least one attribute of an application;
   selecting the solid-state drive for caching at least one input/output operation of the application based at least in part on the attribute of the application in combination with the distinguishing hardware property of the solid-state drive.

2. The computer-implemented method of claim 1, wherein determining the attribute of the application comprises determining an input/output pattern of input/output operations performed by the application.

3. The computer-implemented method of claim 1, wherein determining the attribute of the application comprises determining at least one of:
   a priority level for input/output operations performed by the application;
   a service-level agreement covering the application.

4. The computer-implemented method of claim 1, wherein detecting the distinguishing hardware property of the solid-state drive comprises detecting a data transfer rate of the solid-state drive that differs from a different data transfer rate of an alternative solid-state drive within the plurality of solid-state drives.

5. The computer-implemented method of claim 1, wherein detecting the distinguishing hardware property of the solid-state drive comprises detecting a write endurance of the solid-state drive that differs from an alternative write endurance of an alternative solid-state drive within the plurality of solid-state drives.

6. The computer-implemented method of claim 1, wherein:
   detecting the distinguishing hardware property of the solid-state drive comprises detecting that the solid-state drive comprises a single-level-cell solid-state drive;
   determining the attribute of the application comprises determining that the application is write-intensive according to a predefined write-intensity metric;
   selecting the solid-state drive for caching the input/output operation of the application is based at least in part on the solid-state drive comprising a single-level-cell solid-state drive in combination with determining that the application is write-intensive according to the predefined write-intensity metric.

7. The computer-implemented method of claim 1, wherein:

detecting the distinguishing hardware property of the solid-state drive comprises detecting that the solid-state drive comprises a multi-level-cell solid-state drive;

determining the attribute of the application comprises determining that the application is read-intensive according to a predefined read-intensity metric;

selecting the solid-state drive for caching the input/output operation of the application is based at least in part on the solid-state drive comprising a multi-level-cell solid-state drive in combination with determining that the application is read-intensive according to the predefined read-intensity metric.

8. The computer-implemented method of claim 1, further comprising selecting an alternative solid-state drive within the plurality of solid-state drives for caching at least one input/output operation of an additional application based at least in part on an attribute of the alternative application in combination with a distinguishing hardware property of the alternative solid-state drive.

9. The computer-implemented method of claim 1, further comprising:
determining that the attribute of the application has changed;
selecting an alternative solid-state drive within the plurality of solid-state drives for caching at least one additional input/output operation of the application based at least in part on determining that the attribute of the application has changed in combination with a distinguishing hardware property of the alternative solid-state drive.

10. The computer-implemented method of claim 1, further comprising caching the input/output operation of the application on the solid-state drive.

11. A system for providing caching for applications with solid-state storage devices, the system comprising:
an identification module that identifies a plurality of solid-state drives that are available for caching input/output operations;
a detection module that detects at least one distinguishing hardware property of at least one solid-state drive within the plurality of solid-state drives;
a determination module that determines at least one attribute of an application;
a selection module that selects the solid-state drive for caching at least one input/output operation of the application based at least in part on the attribute of the application in combination with the distinguishing hardware property of the solid-state drive;
at least one processor configured to execute the identification module, the detection module, the determination module, and the selection module.

12. The system of claim 11, wherein the determination module determines the attribute of the application by determining an input/output pattern of input/output operations performed by the application.

13. The system of claim 11, wherein the determination module determines the attribute of the application by determining at least one of:
a priority level for input/output operations performed by the application;
a service-level agreement covering the application.

14. The system of claim 11, wherein the detection module detects the distinguishing hardware property of the solid-state drive by detecting a data transfer rate of the solid-state drive that differs from a different data transfer rate of an alternative solid-state drive within the plurality of solid-state drives.

15. The system of claim 11, wherein the detection module detects the distinguishing hardware property of the solid-state drive by detecting a write endurance of the solid-state drive that differs from an alternative write endurance of an alternative solid-state drive within the plurality of solid-state drives.

16. The system of claim 11, wherein:
the detection module detects the distinguishing hardware property of the solid-state drive by detecting that the solid-state drive comprises a single-level-cell solid-state drive;
the determination module determines the attribute of the application by determining that the application is write-intensive according to a predefined write-intensity metric;
the selection module selects the solid-state drive for caching the input/output operation of the application based at least in part on the solid-state drive comprising a single-level-cell solid-state drive in combination with determining that the application is write-intensive according to the predefined write-intensity metric.

17. The system of claim 11, wherein:
the detection module detects the distinguishing hardware property of the solid-state drive by detecting that the solid-state drive comprises a multi-level-cell solid-state drive;
the determination module determines the attribute of the application by determining that the application is read-intensive according to a predefined read-intensity metric;
the selection module selects the solid-state drive for caching the input/output operation of the application based at least in part on the solid-state drive comprising a multi-level-cell solid-state drive in combination with determining that the application is read-intensive according to the predefined read-intensity metric.

18. The system of claim 11, the selection module selects an alternative solid-state drive within the plurality of solid-state drives for caching at least one input/output operation of an additional application based at least in part on an attribute of the alternative application in combination with a distinguishing hardware property of the alternative solid-state drive.

19. The system of claim 11, further comprising:
the determination module determines that the attribute of the application has changed;
the selection module selects an alternative solid-state drive within the plurality of solid-state drives for caching at least one additional input/output operation of the application based at least in part on determining that the attribute of the application has changed in combination with a distinguishing hardware property of the alternative solid-state drive.

20. A non-transitory computer-readable-storage medium comprising one or more computer-readable instructions that, when executed by at least one processor of a computing device, cause the computing device to:
identify a plurality of solid-state drives that are available for caching input/output operations;
detect at least one distinguishing hardware property of at least one solid-state drive within the plurality of solid-state drives;
determine at least one attribute of an application;
select the solid-state drive for caching at least one input/output operation of the application based at least in part on the attribute of the application in combination with the distinguishing hardware property of the solid-state drive.

* * * * *